United States Patent [19]

Hazaki et al.

[11] Patent Number: 5,256,876
[45] Date of Patent: Oct. 26, 1993

[54] SCANNING TUNNEL MICROSCOPE EQUIPPED WITH SCANNING ELECTRON MICROSCOPE

[75] Inventors: Eiichi Hazaki, Tsuchiura; Osamu Yamada; Yasushi Nakaizumi, both of Katsuta; Shigeyuki Hosoki, Hachioji; Sumio Hosaka, Nishitama; Akira Hashimoto, Tsuchiura, all of Japan

[73] Assignees: Hitachi Ltd.; Hitachi Construction Machinery Co., Ltd., Tokyo, Japan

[21] Appl. No.: 696,787

[22] Filed: May 7, 1991

[30] Foreign Application Priority Data

May 8, 1990 [JP] Japan ................................. 02-118058

[51] Int. Cl.⁵ ............................................. H01J 37/28
[52] U.S. Cl. .................................. 250/306; 250/491.1; 250/310
[58] Field of Search ............ 250/306, 310, 311, 423 F, 250/491.1

[56] References Cited

U.S. PATENT DOCUMENTS

| | | | |
|---|---|---|---|
| 4,798,989 | 1/1989 | Miyazaki et al. | 310/328 |
| 4,837,435 | 6/1989 | Sakuhara et al. | 250/306 |
| 4,874,945 | 10/1989 | Ohi | 250/306 |
| 5,081,353 | 1/1992 | Yamada et al. | 250/306 |

FOREIGN PATENT DOCUMENTS

| | | |
|---|---|---|
| 116349 | 10/1986 | Japan . |
| 298951 | 12/1988 | Japan . |
| 79603 | 3/1989 | Japan . |
| 1-59954 | 6/1989 | Japan . |

OTHER PUBLICATIONS

Takata et al, "Scanning Tunneling Microscope w/ release coarse positioners" Rev. Sci. Instrum. 60(4), Apr. 1989.

Vazquez et al., "Combination of a Scanning Tunneling Microscope with a Scanning Electron Microscope" Rev. Sci. Instrum. 59(8), Aug. 1988.

Primary Examiner—Jack I. Berman
Assistant Examiner—Jim Beyer
Attorney, Agent, or Firm—Antonelli, Terry, Stout & Kraus

[57] ABSTRACT

A scanning tunnel microscope comprising: a SEM stage provided in a specimen chamber of a SEM and having a mechanism for moving in a two dimensional manner along a surface perpendicular to an electron beam; a specimen stage provided on the SEM stage and provided with a mechanism for holding a specimen so that a surface of the specimen makes an angle of 45° with the electron beam and for moving the specimen in a two dimensional manner in directions of the specimen surface; an STM scanning mechanism provided on the SEM stage and provided with a probe held perpendicularly to the specimen surface, a coarse movement mechanism for making the probe approach to a position at a desired distance from the specimen surface, and a probe fine movement mechanism for making the probe scan along the specimen surface; and a display unit for displaying an image by the SEM together with an image of the probe on the basis of signal obtained from a secondary electron detector provided in a specimen chamber and for displaying an image by the STM on the basis of signals from the probe fine movement mechanism.

7 Claims, 4 Drawing Sheets

SCANNING TUNNEL MICROSCOPE EQUIPPED WITH SCANNING ELECTRON MICROSCOPE

BACKGROUND OF THE INVENTION

The present invention relates to a scanning tunnel microscope and more particularly to a scanning tunnel microscope which is designed in such a way that a position of a desired portion on a specimen to be observed with the scanning tunnel microscope is previously positioned by utilizing a scanning electron microscope so that an observation can be then made with respect to the positioned portion.

With respect to a prior art apparatus which is constructed by combining a scanning tunnel microscope (hereinafter, referred to as simply "an STM", when applicable) with a scanning electron microscope (hereinafter, referred to as simply "a SEM", when applicable), the description is shown in an article "Review of Scientific Instruments 60", April, 1989, pp. 789 to 791. In the apparatus described in this article, a specimen is mounted on a specimen holder in such a way that its surface makes an angle of 45° with an electron beam of the SEM. The specimen is then moved towards a probe of the STM by a coarse movement mechanism referred to as an inchworm utilizing a piezoactuator, which serves to linearly move a specimen in a direction perpendicular to the electron beam, so as to approach to a position at a predetermined distance from the probe which allows the tunnel effect to be generated. The probe of the STM is attached to a fine movement mechanism referred to as a piezotripod, so that it is moved along the surface of the specimen, thus performing a scanning operation. The above-mentioned elements constituting the STM are fitted to a stage of the SEM within a specimen chamber of the SEM.

In the prior art apparatus described above, there is provided therein only the coarse movement mechanism which serves lineally to make the specimen approach to the probe to be located in an area allowing generation of the tunnel effect, and also a SEM stage for searching for the probe by utilizing the SEM is not clear in construction.

JP-A-63-116349 (the term JP-A used herein means that the patent application was laid open to public inspection but has not been examined) and JP-A-63-298951 disclose that a position on a specimen to be observed with a STM is previously positioned by utilizing a SEM and that a specimen is adapted to be moved in a two dimensional manner along its surface with its surface being inclined at 45° with an electron beam.

Moreover, JP-A-64-79603 discloses a microscope which is designed in such a way that a specimen is observed at a low magnification with a SEM and the same specimen is observed at a high magnification with a STM.

The prior art described above discloses that a position to be observed with an STM with a higher magnification is determined using a SEM, and then an observation is made with the STM. However, when the apparatus is actually operated, even if the position of the specimen is set in such a way that an observation position determined by the SEM goes to a predetermined position within a visual field of an electron microscope image by the SEM, it is not necessarily easy to make the probe of the STM scan accurately over the observation position determined by the SEM since the position of the probe of the STM is not precisely defined with respect to an image by the SEM.

In other words, only when the relationship among the specimen, the probe and the electron beam is accurately determined, the position positioned by the SEM can be observed accurately at a high magnification with the STM.

SUMMARY OF THE INVENTION

It is therefore an object of the present invention to provide a scanning tunnel microscope which is designed in such a way that a position to be observed with an STM is determined using an SEM and then the position is observed with the STM, wherein an image of a probe of the STM is displayed in an image by the SEM so that a position indicated by the probe can be observed with the STM.

According to the present invention, an STM comprises: a specimen stage provided therein with being inclined at a predetermined angle with an electron beam, and being capable of moving a specimen in a two dimensional manner in directions of a surface of the specimen; an STM system for measuring an STM image by moving a probe held perpendicularly to the surface of the specimen in two directions, one direction being perpendicular to the surface of the specimen and another direction being parallel thereto; and a SEM stage for mounting thereon the specimen stage and the STM system to move them in two directions perpendicular to the electron beam. The SEM stage is adjusted in such a way that a tip of a probe image in a SEM image with a low magnification goes to a center of an image, and similarly such an operation is repeated until a magnification of the SEM image becomes the maximum magnification. Thus, it is possible to display an image of the tip of the probe in the SEM image with the higher magnification without missing an image of the tip of the probe. Therefore, if the specimen stage is moved in such a way that a position to be observed with the STM goes to the position indicated by the probe, an enlarged STM image can be obtained in a desired position.

As described above, according to the STM of the present invention, the SEM stage can be moved in a plane perpendicular to an electron beam, in a state in which the probe is made to approach to a position at a suitable distance from the specimen by driving both the coarse movement mechanism and the fine movement mechanism. Therefore, the SEM stage can be moved arbitrarily without changing a distance between an objective lens and the specimen or probe (working distance), and an arbitrary position within the SEM image can be displayed by moving the specimen stage while maintaining a clear SEM image of the probe. Moreover, since the specimen stage can be moved within a plane making a predetermined angle with the electron beam, the specimen can be moved without changing the working distance, a portion intended to be observed with the STM can be arbitrarily selected while maintaining a clear SEM image of the specimen, and a portion which is selected in the specimen image and is intended to be measured can be moved up to the tip of the probe image which is fixed in the SEM image.

According to the STM of the present invention, in addition thereto, the specimen stage and the coarse movement mechanism provided with the probe are constructed in such a way as to be provided on two planes of the STM base perpendicularly intersecting each other, respectively, and the head portion and the like of the objective lens can be formed in a conical shape. Therefore, the working distance between the specimen and the objective lens can be shortened, and the resolution can be enhanced.

DESCRIPTION OF THE PREFERRED EMBODIMENTS

A preferred embodiment of the present invention will hereinafter be described with reference to the accompanying drawings.

Figure 1:
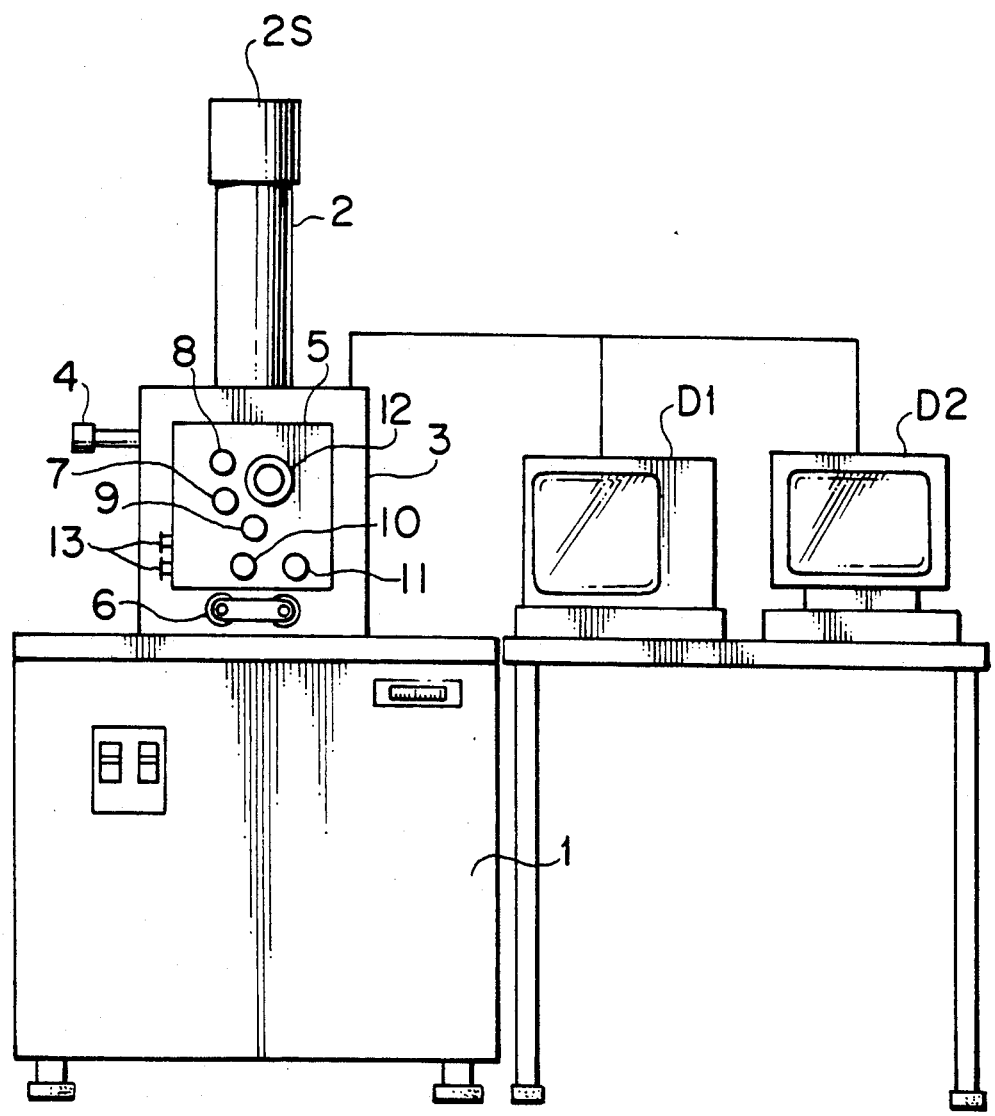
FIG. 1 is a front view showing an appearance of an embodiment of the present invention in which an STM is incorporated in a SEM.

FIG. 1 is a front view showing an appearance of a microscope incorporating therein an STM according to the present invention. The microscope generally shows a SEM in which the STM is incorporated. The reference numeral 1 designates a foothold on which the microscope body is installed. The microscope body comprises a gun cylinder 2 of the SEM, an electron beam source 2S, a specimen chamber 3, a secondary electron detector 4 provided in a side wall of the specimen chamber 3, and a closure portion 5 which is provided in the specimen chamber 3 so as to be capable of opening or closing. The closure portion 5 is guided by a rail 6 constructed by a linear bearing or the like to be taken out towards this side in FIG. 1 with respect to the specimen chamber 3. The STM is provided in the specimen chamber 3 and is coupled to a structure formed in the inside of the closure portion 5, thus performing an installation thereof. The construction of the STM attaching portion inside the closure portion 5 will be described later. The structure to which the STM is attached has a SEM stage which is moved in two dimensions (X, Y) and a specimen stage of the STM which is moved in two dimensions (x, y), and an STM base is provided on the SEM stage. Corresponding to such a construction, the closure portion 5 is provided with an x-lug 7 and a y-lug 8 used for moving the specimen stage of the STM in an x- and y-directions, respectively, a lock lug 9 for fixing the STM base for the purpose of mechanically stopping the specimen stage, an X-lug 10 and a Y-lug 11 used for moving the SEM stage in an X- and Y-directions, respectively, an observation hole 12, and hermetic sealed terminals 13 for relaying input/output lines of the STM. The signals produced by the measurement by the SEM and STM are image-processed by a SEM display unit D1 and an STM display unit D2 to be displayed thereon, respectively.

Figure 2:
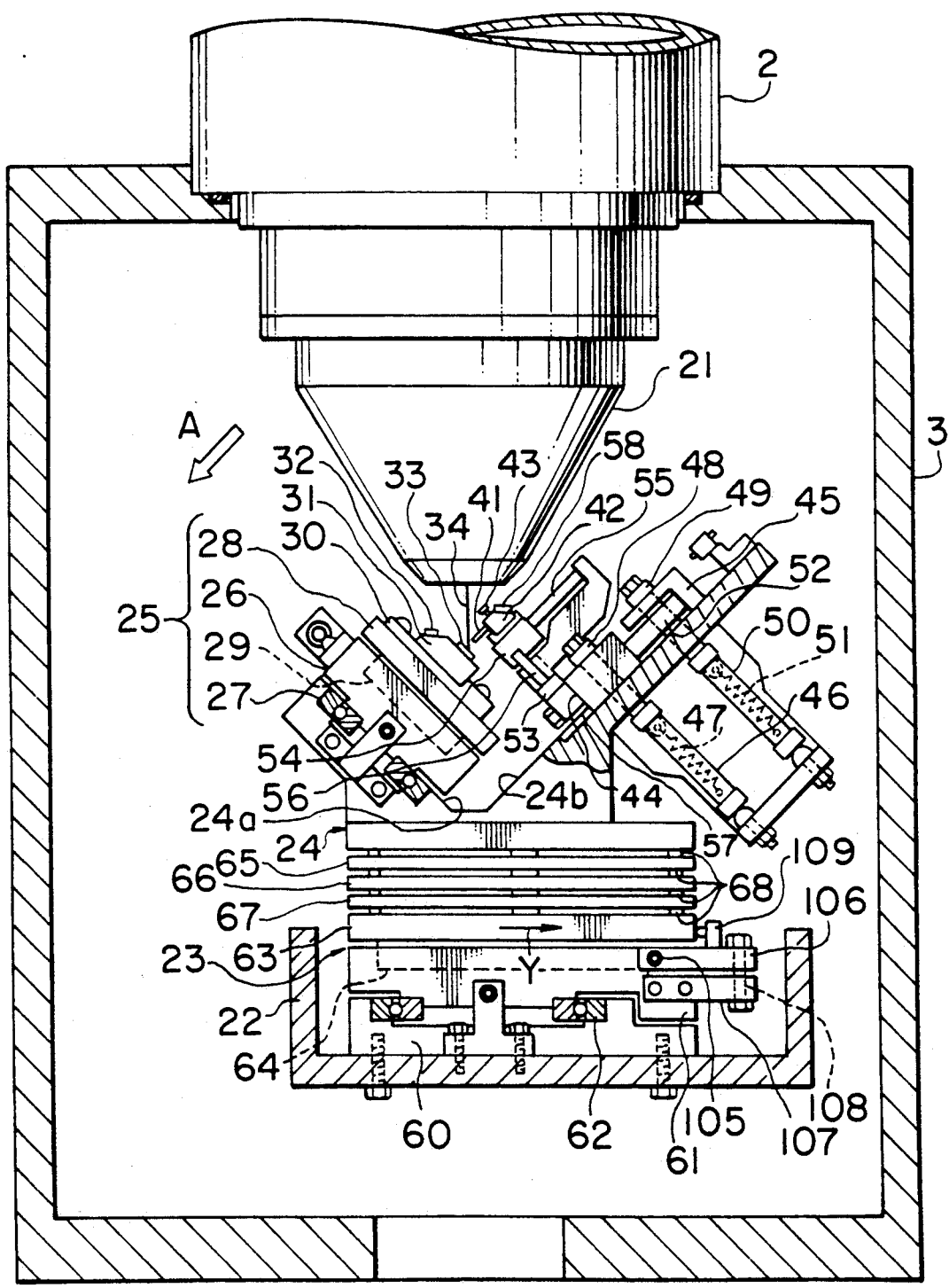
FIG. 2 is a front view showing an internal constitution of a specimen chamber.

The description will subsequently be given with respect to the construction of the STM attaching portion provided in the inside of the closure portion 5 of the specimen chamber 3. FIG. 2 is a front view showing an internal constitution when the specimen chamber 3 is viewed from the front side of FIG. 1 where portions coupled to the lugs 8 through 10 are omitted for brevity.

Figure 3:
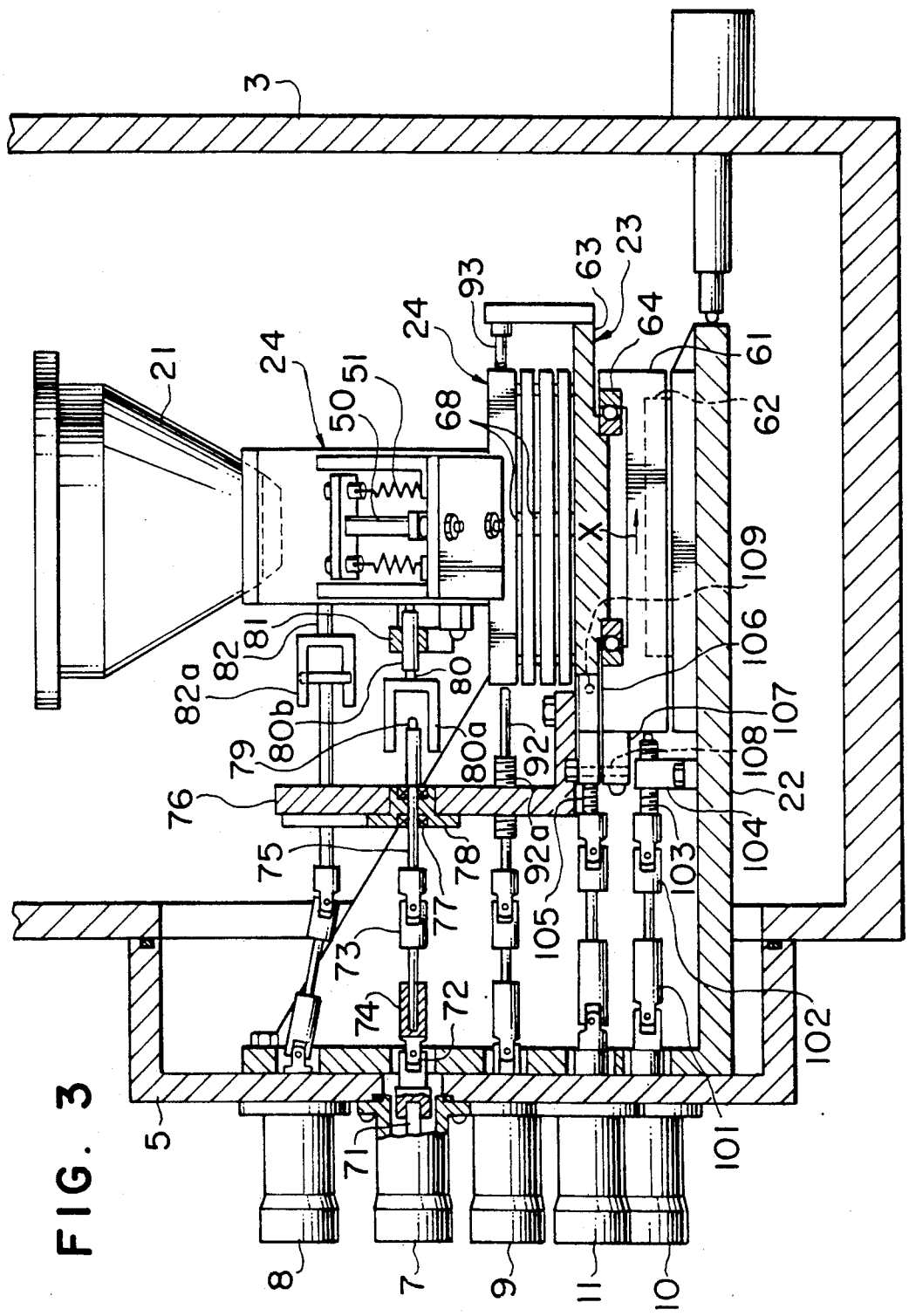
FIG. 3 is a side view showing the internal constitution of the specimen chamber.

FIG. 3 is a side view showing the internal constitution when the specimen chamber 3 is viewed from the right-hand side of FIG. 1. As shown in FIG. 2 and FIG. 3, to an upper wall of the specimen chamber 3 is connected a lower portion of the gun cylinder 2 in which an objective lens 21 of the SEM is provided. In a lower position of the objective lens 21 is disposed the STM attaching structure. The reference numeral 22 designates a main base which is fixedly mounted to an internal surface of the closure portion 5, and on the main base 22 is mounted the STM attaching portion. The STM attaching portion is constructed in such a way that a SEM stage 23 is disposed on the main base 22 and an STM base 24 is disposed on the SEM stage 23.

The construction of the STM base 24 will first be described.

As shown in FIG. 2, the STM base 24 is formed so as to have two surfaces 24a and 24b which are arranged to perpendicularly intersect each other. To the surface 24a is mounted a specimen stage 25. The specimen stage 25 is made up of an x-stage 26, a crossed roller bearing 27 for guiding the x-stage, a y-stage 28, and a crossed roller bearing 29 for guiding the y-stage. The x-stage 26 is actuated movably in an x-direction (the direction perpendicular to the drawing of FIG. 2) by the x-lug 7, and the y-stage 28 is actuated movably in a y-direction (the direction parallel to the drawing, i.e., the inclined direction of the surface 24a; the x- and y-directions perpendicularly intersect each other) by the y-lug 8. The detail of a movable mechanism will be described later. On an upper surface of the y-stage 28 is fixedly mounted a holder stand 30 on which a holder 31 having a specimen 33 attached thereto by adhesion is fixed by a pressure bar spring 32.

Since the surface 24a of the STM base 24 makes an angle of 45° with an electron beam 24 emitted from a tip of the objection lens 21, the specimen 33 disposed parallel with the surface 24a can be moved in a two dimensional manner in a plane which makes an angle of 45° with the electron beam 34 by the x-stage 26 and the y-stage 28. Therefore, even when the specimen stage 25 is moved freely in the x- or y-direction, a distance between the fixed objective lens 21 and the position on the surface of the specimen 33 which is irradiated with the electron beam 34, i.e., a working distance is maintained constant.

On the other hand, on the surface 24b are mounted elements of the STM including therein a probe, a fine movement mechanism thereof, a coarse movement mechanism thereof and the like. The reference numeral 41 designates a probe which is arranged perpendicular to the surface of the specimen 33. The probe 41 is fixed to a probe holder 42 by a screw 43. The reference numerals 44 and 45 designate feet of an inchworm as the coarse movement mechanism for making the probe 41 approach to a position at a predetermined distance from the specimen 33 which allows generation of the tunnel current. The feet 44 and 45 are disposed on the surface 24b. The inchworm is moved as follows by the mechanism of the feet 44 and 45. A suitable voltage is applied to a piezoactuator 46 so as to overcome an elastic force of a tension spring 47 to extend a clamper 48. Thus, the clamper 48 is made to be apart from the foot 44 to provide an unclamping state. The foot 45 is clamped by switching a voltage applied to a piezoactuator 50 for a clamper 49 off to urge a tension spring 51 to return to its original state. In this clamping state, when a suitable voltage is applied to a piezoactuator 52 coupling the feet 44 and 45 to each other, the piezoactuator 52 is stretched. Subsequently, when the voltage applied to the piezoactuator 52 is switched off after the mechanism of the foot 44 is switched to the clamping stage and that of the foot 45 is switched to the unclamping state, the piezoactuator 52 contracts to make each of the feet 44 and 45 to take one step forwards. By repeating the above operation control, the inchworm can be made to advance. This advancing actuation allows the probe 41 provided on the inchworm to approach towards the specimen 33. Moreover, the reverse operation control is carried out for each of the mechanisms of the feet 44 and 45 of the inchworm, thereby to make the inchworm retrogress. Incidentally, the feet 44 and 45 are guided by grooves 57 formed in the surface 24b to be moved. There is well known the inchworm as described above and there is also known an inchworm having a construction other than that described above.

A tripod base 53 is mounted on the foot 44. The tripod base 53 is provided with a tripod head 54 to which the above-mentioned probe holder 42 is fixed by a pressure bar spring 58. The tripod head 54 is supported on the tripod base 53 by three piezoactuators for fine movement. One of them, i.e, a piezoactuator 55 serves to make the probe 41 approach to or be apart from the specimen 41. The remaining two piezoactuators serve to make the probe 41 scan along the surface of the specimen 33, but in the figure, one piezoactuator 56 alone is typically shown. The above elements make up a piezotripod which serves to move the probe 41 so as to scan over the surface of the specimen 33 with keeping a predetermined distance, and makes up the fine movement mechanism for producing an STM image. Incidentally, there is well known such a tripod and there have been proposed various types of tripod other than that described above.

The description will subsequently be given with respect to the construction of the SEM stage 23.

As shown in FIG. 2, the SEM stage 23 is constructed in such a way that on a base stand 60 fixedly mounted on the main base 22 are provided an X-stage 61 which is movable in a direction perpendicular to the drawing of FIG. 1, a crossed roller bearing 62 for guiding X-stage, a Y-stage 63 which is movable in horizontal, and right and left directions in FIG. 1, and a crossed roller 64 for guiding the Y-stage. With the SEM stage 23, such a construction allows the STM base 24 to be moved in a plane perpendicular to the electron beam 34. The above-mentioned STM base 24 provided with the specimen stage 25 and the elements of the STM is mounted on the Y-stage 63 of the SEM stage 23 through three metal plates 65, 66 and 67. For the purpose of preventing vibration from being transmitted from the specimen chamber 3 to the STM base 24, rubber members 68 are inserted between the Y-stage 63, the metal plates 65 through 67, and the STM base 24.

According to the above construction, by operating the specimen stage 25, an arbitrary portion in the surface of the specimen 33 can be selected to be displayed as a clear image while maintaining the working distance constant. Moreover, by operating the SEM stage 23, the specimen 33 and the probe 41 can be moved together with each other while maintaining the working distance constant. Thus, since the position of the tip of the probe can be displayed as a clear image and the tip of the probe image can be moved to a desired position within the visual field of the SEM image, even when the magnification of the SEM image is increased, the probe image can be clearly displayed in the SEM image without being missed. Accordingly, the probe image can be clearly displayed in the SEM image with the highest magnification, and therefore, a portion of the surface of the specimen with which an STM image is intended to be formed can be brought to the position indicated by the tip of the probe by operating the specimen stage. As a result, a desired STM image can be accurately displayed.

In this regard, with respect to a position of a portion of the surface of the specimen which is intended to be measured with the STM, when the probe 41 is made to approach towards the surface of the specimen 33 until the tunnel effect is generated in the specimen, the tip of the probe image in the SEM image can be substantially regarded as a measurement position. When the probe 41 is made to be apart from the surface of the specimen 33, the isolated distance can be obtained on the basis of the applied voltage to the piezoactuators 52 and 53. Therefore, this distance can be obtained from a distance between the tip of the probe image displayed in the SEM image and the surface of the specimen by taking the magnification of the SEM image into consideration.

Next, the description will be given with respect to the construction for moving the x-stage 26 and the y-stage 28 of the specimen stage 25 and the X-stage 61 and Y-stage 63 of the SEM stage 23, and the moving method thereof.

The description will first be given with respect to the specimen stage 25 shown in FIG. 2 on referring to FIG. 3. The x-stage 26 (not shown in FIG. 3) is moved by rotation of the x-lug 7. To an axis 71 of the x-lug 7 is coupled an universal joint 72 to which another universal joint 73 is coupled. An expansion mechanism 74 for absorbing a change in distance is provided between the universal joints 72 and 73. To the universal joint 73 is coupled a connecting shaft 75 which is supported by bearings 77 and 78 mounted to a supporting plate 76. The supporting plate 76 is fixedly mounted to the Y-stage 63 of the SEM stage 23. The tip of the connecting shaft 75 is provided with a bar 79 perpendicular thereto which mates with a fork portion 80a of a drive shaft 80 to rotate the drive shaft 80. When the rotation of the connecting shaft 75 is reversed, a clearance is present. But, this clearance provides no direct connection between the bar 79 and the fork portion 80a, and therefore, it is possible to prevent the vibration from being transmitted from the closure portion 5 to the specimen stage. The peripheral surface of the drive shaft 80 is threaded to form a male screw 80b which is screwed in a female screw of a female screw stand 81 fixed to the STM base 24. When the drive shaft 80 is rotated through the screwing relationship to be moved in a direction of the axis, the end portion of the drive shaft pushes the x-stage 26 to move it in the x direction. On the other hand, the drive shaft 80 is reversed to perform the reverse movement by an elastic force of a spring (not shown). Moreover, during the measurement by the STM, the bar 79 is held away from the fork portion 80a by the clearance so that the vibration is prevented from being transmitted from the specimen chamber 3 to the specimen stage 25.

Figure 4:
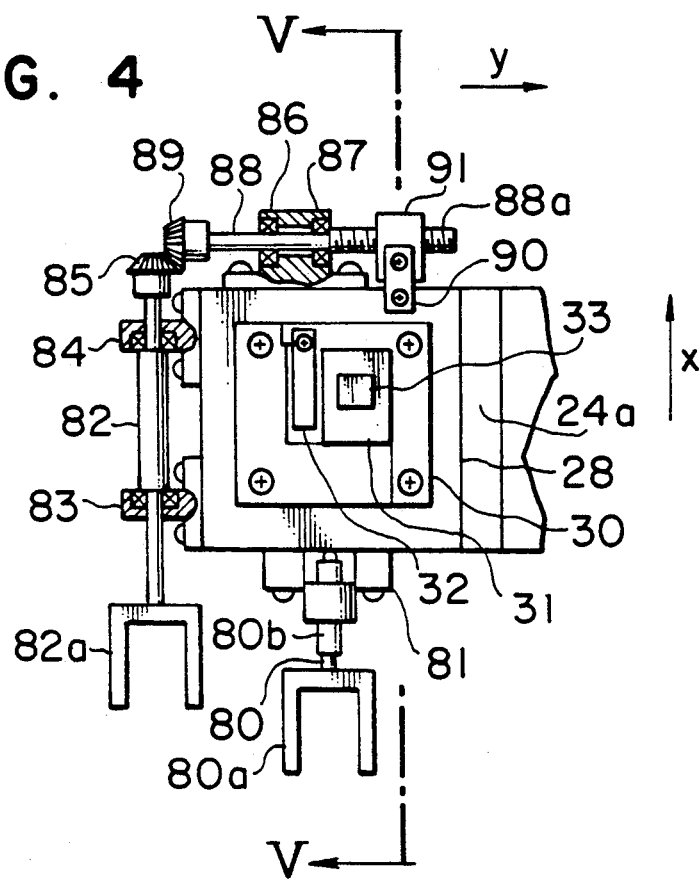
FIG. 4 is a plan view showing a specimen stage.
Figure 5:
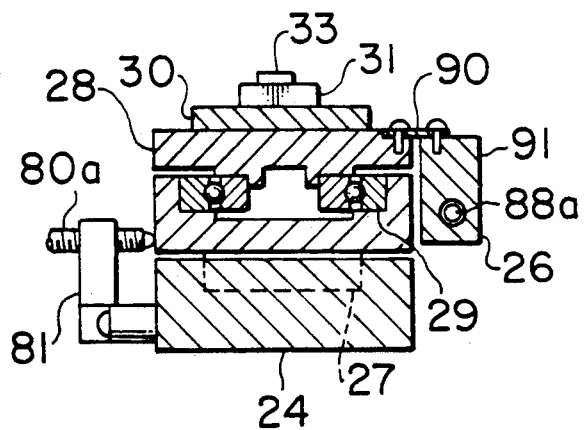
FIG. 5 is a cross sectional view taken on the line V—V of FIG. 4.

The y-stage 28 is moved by operating the y-lug 8. With the construction of a connecting portion for actuating the y-stage as shown in FIG. 3, the construction up to a portion where a bar mates with a fork portion 82a of a drive shaft 82 is the same as that in the case of the x-stage 26. The rest of the construction is different therefrom as shown in FIG. 4. FIG. 4 is a plan view partly in section when the specimen stage 25 shown in FIG. 2 is viewed from direction of an arrow A. In FIG. 4, the reference numeral 24a designates one surface of the STM base 24; the reference numeral 28 designates the y-stage; the reference numeral 30 designates the holder stand; the reference numeral 31, the holder for the specimen; the reference numeral 32, the pressure bar spring; and the reference numeral 33, the specimen. Moreover, the reference numeral 80 designates the drive shaft for moving the x-stage 26; the reference numeral 80a designates the fork portion of the drive shaft; the reference numeral 80b, the male screw; and the reference numeral 81, the female screw stand. The drive shaft 82 is supported by two bearings 83 and 84 and is fixedly mounted to the side of the x-stage 26. Another end portion of the drive shaft 82 is provided with a bevel gear 85 which engages with a bevel gear 89 at one end portion of a transforming shaft 88 which is supported by two bearings 86 and 87 and is fixedly mounted to the x-stage 26. Another end portion of the transforming shaft 88 is threaded to form a male screw 88a which engages with a female screw stand 91 which is fixed to the y-stage 28 through a flat spring 90. When the transforming shaft 88 is rotated by the engagement function between the male screw 88a of the transforming shaft 88 and the female screw stand 91, the y-stage 28 can be moved in the y-direction. FIG. 5 is a cross sectional view taken on the line V—V of FIG. 4. According to this figure, there is clearly shown the mounting relationship between the y-stage 28 and the female screw stand 91 through the flat spring 90.

Moreover, as shown in FIG. 3, with the STM base 24, by rotating the lock lug 9, a lock rod 92 can be moved in a direction of an axis on the basis of the engagement function between a female screw (not shown) formed in the supporting plate 76 and a male screw 92a of the lock rod 92. Through this movement function, the tip of the lock rod 92 and a stopper member 93 fixedly mounted to the Y-stage 673 of the SEM stage 23 can hold therebetween the STM base 24 to fix it. This construction is employed to eliminate a blur of an image due to the swing of the specimen 33 and the probe relative to the objective lens 21 when making an observation with the SEM.

The SEM stage 23 will subsequently be described. The structure for moving the X-stage 61 is, as shown in FIG. 3, made up of the X-lug 10, and the universal joints 101 and 102. The structure serves to rotate a drive shaft 103 through a connecting portion by rotating the X-lug 10. The construction of the connection portion including therein the universal joints 101 and 102 is the same as that described with respect to the x-lug 7. The peripheral surface of a drive shaft 103 is threaded to form a male screw which is screwed in a female screw stand 104 which is fixed to the main base 22. The drive shaft 103 is moved in a direction of an axis by this screwing relationship to push the X-stage 61, thus moving it. In the case of the reverse movement, since a spring (not shown) is in a stretched state, the X-lug 10 is rotated so that the drive shaft 103 is reversed, thereby to move the X-stage in the reverse direction.

Figure 6:
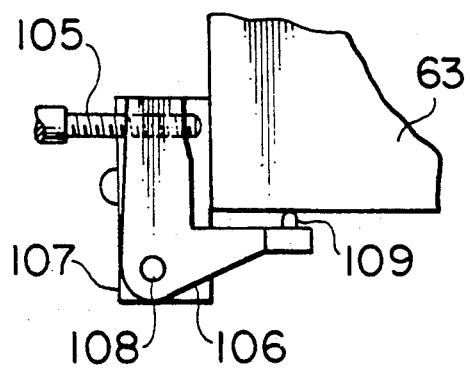
FIG. 6 is a plan view showing main portions of the specimen chamber shown in FIG. 3.

With respect to the structure for moving the Y-stage 63, the individual elements of the structure through which a drive shaft 105 is rotated is the same as those in the case of the X-stage. The peripheral surface of the drive shaft 105 is threaded to form a male screw which is screwed in a female screw formed at one end portion of a lever 106 as shown in FIG. 6. The lever 106 is pivotted to a shaft 108 which is provided in a supporting block 107 fixed to the X-stage 61. When the drive shaft 105 is rotated corresponding to the rotation of the Y-lug 11, the lever 106 is rotated around the shaft 108 by the engagement function between the male screw and the female screw, and a protruding portion 109 provided at another end portion of the lever 106 pushes the Y-stage 63 to move it in the Y-direction. In the case of the reverse movement, in the same way as in the X-stage, the Y-stage is returned by an elastic force of a spring (not shown).

As shown in FIG. 2, as already described above, the STM base 24 is constructed in such a way that the specimen stage and the STM elements are respectively mounted on the surfaces 24a and 24b perpendicularly intersecting each other. The objective lens 21 of the SEM is disposed so as to confront with the STM base 24. However, since the head portion of the objective lens 21 is formed in a conical shape, it is possible to arrange the head portion of the objective lens 21 so as to be near the specimen 33. Due to this arrangement, the working distance becomes small, the resolution of an observation for the specimen 33 and the probe 41 by the SEM is improved, and a portion to be measured by the STM can be accurately selected.

As apparent from the above description, according to the present invention, in the specimen chamber of the SEM, the specimen stage having the specimen attached thereto, and STM elements including therein the probe, inchworm and the like are disposed on the SEM stage, the specimen stage and the SEM stage are constructed in such a way as to be respectively moved in the planes 23 which make predetermined angles with the electron beam, and the specimen and the probe are adapted to be moved arbitrarily and independently of each other while maintaining the working distance constant. Therefore, a portion on the surface of the specimen to be intended to be observed can be readily selected with accuracy. Moreover, in the case of a smaller magnification, the observation is made with the SEM. The specimen can be observed at a magnification higher than the maximum magnification of the SEM by one or two orders with the STM, and therefore, the observation can be made at a high magnification with the STM. Thus, such a construction allows the same portion of the specimen to be observed by utilizing a wide range of magnification.

We claim:

1. A scanning tunnel microscope comprising:
 a scanning electron microscope stage provided in a specimen chamber of a scanning electron microscope and having therein a scanning electron microscope stage movement means for moving the scanning electron microscope stage in a two dimensional manner along a surface substantially perpendicular to an electron beam emitted from an electron beam source of said scanning electron microscope;
 a specimen stage provided on said scanning electron microscope stage and provided with means for holding a specimen so that a surface of said specimen makes a predetermined angle with the electron beam from said electron beam source, and for moving said specimen in a two dimensional manner only in directions of the surface of said specimen;
 a scanning tunnel microscope scanning mechanism provided on said scanning electron microscope stage and provided with a probe held substantially perpendicular to the surface of said specimen, a coarse movement mechanism for making said probe approach to a position at a desired distance from the surface of said specimen, and a probe fine movement mechanism for making said probe scan along the surface of said specimen; and at least one display unit for displaying thereon an image by said scanning electron microscope together with an image of said probe on the basis of signals obtained from a secondary electron detector provided in said specimen chamber, and for displaying thereon an image by said scanning tunnel microscope on the basis of signals outputted by said probe fine movement mechanism.

2. A scanning tunnel microscope according to claim 1, further comprising a scanning tunnel microscope base fixed on said scanning electron microscope stage and holding said specimen stage and said scanning tunnel microscope scanning mechanism.

3. A scanning tunnel microscope according to claim 2, wherein said scanning tunnel microscope base includes therein two surfaces substantially, perpendicularly intersecting each other and formed so as to confront with an objective lens of said scanning electron microscope, and said specimen stage is provided on one surface and said scanning tunnel microscope scanning mechanism are provided on another surface so that when said scanning electron microscope stage is moved, said specimen on said specimen stage and said probe held by said scanning tunnel microscope scanning mechanism are moved together with each other while maintaining a fixed positional relationship therebetween.

4. A scanning tunnel microscope according to claim 3, wherein an external form of said objective lens is formed in a conical shape so that a diameter of said objective lens becomes small as a portion of said objective lens is located nearer said scanning tunnel microscope base.

5. A scanning tunnel microscope according to claim 1, wherein said probe fine movement mechanism of said scanning tunnel microscope scanning mechanism holds said probe and is provided on a movable portion of said coarse movement mechanism.

6. A scanning tunnel microscope according to claim 1, wherein said specimen stage enables movement of said specimen in the two dimensional manner while maintaining a fixed positioned relationship with respect to at least one of said probe and an objective lens of the scanning electron microscope, thereby enabling appropriate display on the at least one display unit of the image of said specimen together with the image of said probe.

7. A scanning tunnel microscope according to claim 6, wherein said specimen stage enables movement of said specimen in the two dimensional manner while maintaining the fixed relation with said objective lens of said scanning electron microscope and said probe.

* * * * *